US008996775B2

(12) United States Patent
Dhandapani et al.

(10) Patent No.: US 8,996,775 B2
(45) Date of Patent: *Mar. 31, 2015

(54) BACKPLANE CONTROLLER FOR MANAGING SERIAL INTERFACE CONFIGURATION BASED ON DETECTED ACTIVITY

(75) Inventors: Kayalvizhi Dhandapani, Suwanee, GA (US); Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 179 days.

This patent is subject to a terminal disclaimer.

(21) Appl. No.: 13/114,163

(22) Filed: May 24, 2011

(65) Prior Publication Data
US 2012/0239845 A1    Sep. 20, 2012

Related U.S. Application Data

(63) Continuation of application No. 13/050,804, filed on Mar. 17, 2011.

(51) Int. Cl.
    *G06F 13/00*    (2006.01)
    *G06F 3/06*    (2006.01)
(52) U.S. Cl.
    CPC ............ *G06F 3/0604* (2013.01); *G06F 3/0635* (2013.01); *G06F 3/0683* (2013.01); *G06F 2213/3802* (2013.01)
    USPC .......................................... 710/300; 710/313
(58) Field of Classification Search
    USPC ............. 710/62, 64, 300, 301, 302, 104, 313; 711/4, 200, 221
    See application file for complete search history.

(56) References Cited

U.S. PATENT DOCUMENTS

| 4,775,931 | A  | * | 10/1988 | Dickie et al. .................. 710/9 |
| 5,038,320 | A  | * | 8/1991  | Heath et al. .................. 710/10 |
| 5,794,014 | A  | * | 8/1998  | Shetty et al. .................. 703/25 |
| 6,418,492 | B1 | * | 7/2002  | Papa et al. .................. 710/302 |
| 6,754,747 | B2 | * | 6/2004  | Locklear et al. .............. 710/100 |
| 6,898,670 | B2 | * | 5/2005  | Nahum ........................ 711/114 |
| 7,099,904 | B2 | * | 8/2006  | Nakatsuka ................... 707/781 |
| 7,444,437 | B2 | * | 10/2008 | Shikada ........................... 710/9 |
| 7,613,843 | B1 | * | 11/2009 | Dhandapani et al. ............. 710/8 |
| 7,685,329 | B1 | * | 3/2010  | Sivertsen ....................... 710/15 |
| 7,856,489 | B2 | * | 12/2010 | Mouser et al. ............... 709/221 |

(Continued)

*Primary Examiner* — Khanh Dang
(74) *Attorney, Agent, or Firm* — Morris Manning & Martin, LLP; Tim Tingkang Xia, Esq.

(57) ABSTRACT

According to one aspect, a backplane controller of a storage backplane is disclosed, the storage backplane having a plurality of drive slots configured to operatively connect to a corresponding plurality of mass storage devices. In one embodiment, the backplane controller is operative to perform functions that include detecting activity status on a first serial interface that is configured to operatively connect one or more sets of a plurality of drive slots on the storage backplane to a host bus adapter (HBA), according to a first drive slot assignment. The backplane controller is further operative to detect an activity status on a second serial interface that is configured to operatively connect one or more sets of a plurality of drive slots on the storage backplane to the HBA, according to a second drive slot assignment. The backplane controller is also operative to, if a change in the activity status is detected for at least one of the first serial interface and the second serial interface, modify the first drive slot assignment and the second drive slot assignment.

17 Claims, 3 Drawing Sheets

(56) References Cited

U.S. PATENT DOCUMENTS

| | | | |
|---|---|---|---|
| 7,945,702 B1* | 5/2011 | Son et al. | 710/3 |
| 7,958,299 B2* | 6/2011 | Chien | 711/4 |
| 2003/0197676 A1* | 10/2003 | Smith | 345/156 |
| 2005/0138154 A1* | 6/2005 | Seto | 709/223 |
| 2006/0143332 A1 | 6/2006 | Yagi et al. | |
| 2006/0194460 A1* | 8/2006 | Chen et al. | 439/108 |
| 2009/0259749 A1* | 10/2009 | Barrett et al. | 709/224 |
| 2012/0173783 A1* | 7/2012 | Sinykin et al. | 710/300 |

* cited by examiner

BACKPLANE CONTROLLER FOR MANAGING SERIAL INTERFACE CONFIGURATION BASED ON DETECTED ACTIVITY

CROSS-REFERENCE TO RELATED PATENT APPLICATION

This application is a continuation of, and claims benefit of U.S. patent application Ser. No. 13/050,804, filed Mar. 17, 2011, entitled "DATA STORAGE SYSTEM FOR MANAGING SERIAL INTERFACE CONFIGURATION BASED ON DETECTED ACTIVITY" by Clas Sivertsen and Kayalvizhi Dhandapani, the disclosure of which is incorporated herein by reference in its entirety.

FIELD OF THE INVENTION

The present invention generally relates to a backplane controller in a data storage system, and more particularly to a backplane controller for managing configurations of serial interfaces based on detected activity.

BACKGROUND OF THE INVENTION

Serial interfaces can be used to connect a host bus adapter (HBA) and a storage backplane. For instance, one or more serial general purpose input/output (SGPIO) interfaces can be used to carry management information associated with drive slots that connect mass storage devices to the storage backplane. A backplane controller can be used to decode the protocol information in the management information and control the drive slots based on the protocol information. A backplane controller may control 4-8 drive slots using sideband communication carrying SGPIO, SES, SAF-TE, or other defined protocols. Conventionally, drive slot assignments cannot be dynamically reconfigured based on detected activity on serial interfaces.

Therefore, a heretofore unaddressed need still exists in the art to address the aforementioned deficiencies and inadequacies.

SUMMARY OF THE INVENTION

In one aspect, the present invention relates to a backplane controller of a storage backplane having a plurality of drive slots configured to operatively connect to a corresponding plurality of mass storage devices. In one embodiment, the backplane controller is operative to perform functions that include detecting activity status on a first serial interface that is configured to operatively connect one or more sets of a plurality of drive slots on the storage backplane to a host bus adapter (HBA), according to a first drive slot assignment. The backplane controller is further operative to detect an activity status on a second serial interface that is configured to operatively connect one or more sets of a plurality of drive slots on the storage backplane to the HBA, according to a second drive slot assignment and, if a change in the activity status is detected for at least one of the first serial interface and the second serial interface, modify the first drive slot assignment and the second drive slot assignment. A set of drive slots is defined by a particular number of drive slots, n, where n is an integer greater than one.

Active status for a serial interface corresponds to data being actively communicated between the HBA and storage backplane via the serial interface and inactive status corresponds to data not being actively communicated between the HBA and storage backplane via the serial interface. Each of the first serial interface and second serial interface are operative to, in active status, communicate data comprising at least one of mass storage device indicators, failure indicators, location indicators, and rebuild indicators. Activity status detection is performed at regular time intervals and a change in activity status corresponds to a different activity status detected for a second time interval than the activity status detected for a first, immediately prior time interval.

In one embodiment, at least one of the first serial interface and the second serial interface is a serial general purpose input/output (SGPIO) interface and at least one of the mass storage devices is a hard disk drive.

The backplane controller is further operative to, if a change in the activity status is detected wherein the first serial interface is active and the second serial interface is inactive, modify the drive slot assignments such that both the first set of drive slots and the second set of drive slots are communicatively connected to the HBA via the first serial interface. Modifying the drive slot assignments includes reconfiguring control parameters for the first serial interface such that the first serial interface is operative to communicate data corresponding to operation of the first set of drive slots and second set of drive slots, and clearing the control parameters for the second serial interface.

The backplane controller is also operative to, if a change in the activity status is detected wherein the first serial interface is inactive and the second serial interface is active, modify the drive slot assignments such that both the first set of drive slots and the second set of drive slots are communicatively connected to the HBA via the second serial interface. Modifying the drive slot assignments includes reconfiguring control parameters for the second serial interface such that the second serial interface is operative to communicate data corresponding to operation of the first set of drive slots and second set of drive slots, and clearing the control parameters for the first serial interface.

Further, the backplane controller is operative to, if a change in the activity status is detected wherein the first serial interface and the second serial interface are both active, modify the drive slot assignments such that the first set of drive slots is communicatively connected to the HBA via the first serial interface and the second set of drive slots is communicatively connected to the HBA via the second serial interface. Modifying the drive slot assignments includes reconfiguring control parameters for the first serial interface and the second serial interface such that the first serial interface is operative to communicate data corresponding to operation of the first set of drive slots and the second serial interface is operative to communicate data corresponding to operation of the second set of drive slots.

In yet another aspect, the present invention relates to a backplane controller of a storage backplane having a plurality of drive slots configured to operatively connect to a corresponding plurality of mass storage devices. In one embodiment, the backplane controller is operative to perform functions that include detecting activity status on each of a plurality of serial interfaces that are each configured to operatively connect one or more sets of the plurality of drive slots to a host bus adapter (HBA), according to a respective drive slot assignment and, if a change in the activity status is detected for at least one of the plurality of serial interfaces, modify the drive slot assignment for each respective one of the plurality of serial interfaces. A set of drive slots is defined by a particular number of drive slots, n, where n is an integer greater than one.

Active status for a serial interface corresponds to data being actively communicated between the HBA and storage backplane via the serial interface and inactive status corresponds to data not being actively communicated between the HBA and storage backplane via the serial interface. Each of the plurality of serial interfaces is operative to, in active status, communicate data comprising at least one of mass storage device indicators, failure indicators, location indicators, and rebuild indicators. Activity status detection is performed at regular time intervals and a change in activity status corresponds to a different activity status detected for a second time interval than the activity status detected for a first, immediately prior time interval.

In yet another aspect, the present invention relates to a backplane controller of a storage backplane having a plurality of drive slots configured to operatively connect to a corresponding plurality of mass storage devices. In one embodiment, the backplane controller is operative to perform functions that include detecting activity status on each of a plurality of serial interfaces that are each configured to operatively connect one or more sets of the plurality of drive slots to a host bus adapter (HBA), according to a respective drive slot assignment. A set of drive slots is defined by a particular number of drive slots, n, where n is an integer greater than one.

In one embodiment, the plurality of serial interfaces includes more than two serial interfaces and at least two of the plurality of serial interfaces are serial general purpose input/output (SGPIO) interfaces.

The backplane controller is further operative to, if a change in the activity status is detected for at least one of the plurality of serial interfaces, modify the drive slot assignment for each respective one of the plurality of serial interfaces.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
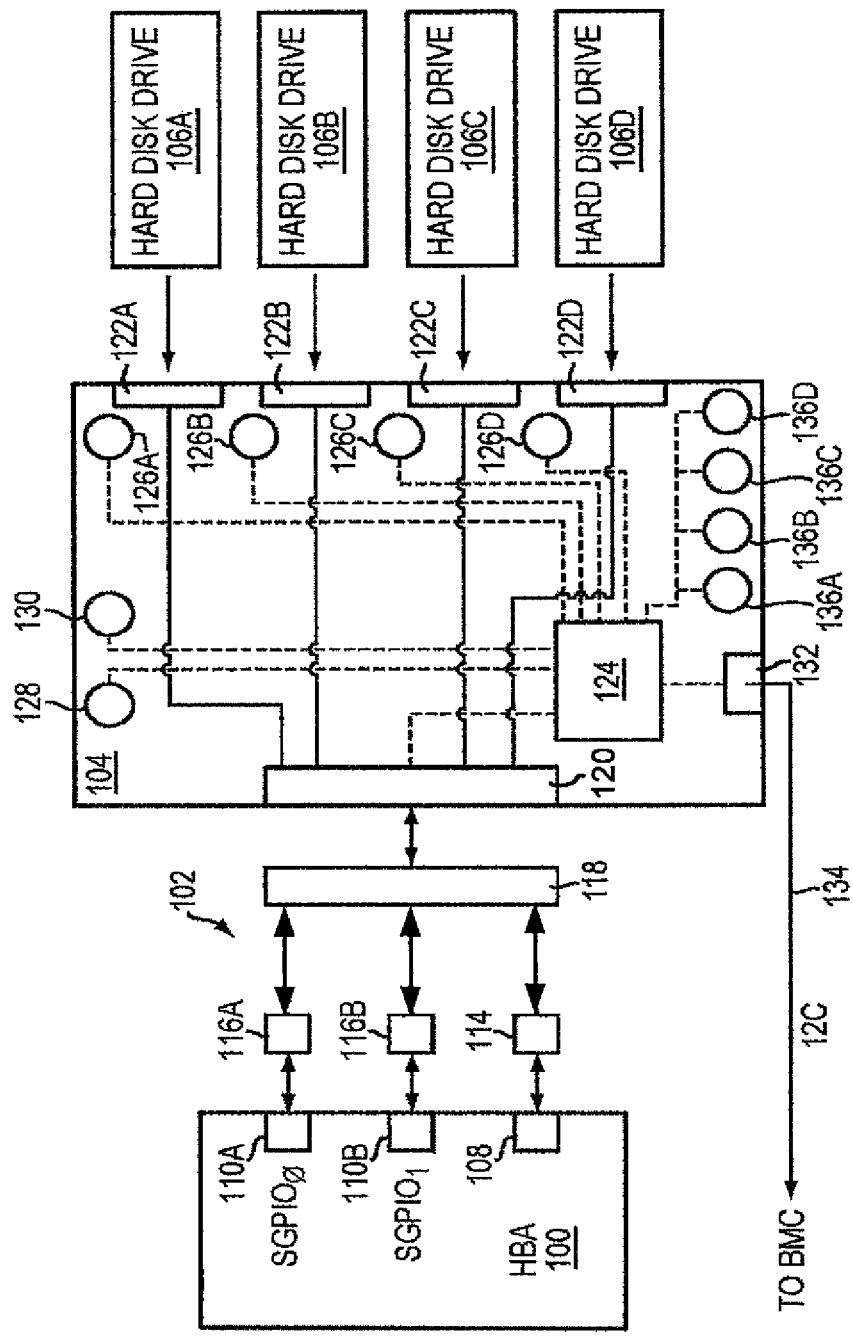
FIG. 1 is a block diagram illustrating aspects of a data storage system including a host bus adapter (HBA), storage backplane, and backplane controller according to embodiments presented herein.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments in conjunction with the accompanying drawings in FIGS. 1-3. Referring now to FIG. 1, a block diagram illustrates aspects of a host bus adapter (HBA) 100, storage backplane 104, and backplane controller 124 according to embodiments presented herein. An HBA 100 having one or more ports 108, 110A, 110B may be utilized in conjunction with a computing system. According to embodiments, the HBA 100 may support SATA mass storage devices, SAS mass storage devices, or some other type of interface for mass storage.

According to embodiments, different physical interfaces may be utilized by the HBA 100 to exchange enclosure management data between the HBA 100 and the storage backplane 104. For instance, an SAS compatible HBA may be equipped with one or more serial general purpose input/output (SGPIO) interfaces. As another example, a SATA compatible HBA may provide a control or management bus to exchange management data between the storage backplane 104 and the HBA 100 or a baseboard management controller (BMC). An HBA 100 equipped with SGPIO may provide SGPIO ports 116A, 116B for making appropriate connections to the storage backplane 104.

An I2C port may be available on a BMC to communicate with the storage backplane 104. It should be appreciated that the particular physical interfaces described herein for exchanging management information with the backplane are merely illustrative and that any physical communications link suitable for transmitting management data may be utilized with the various embodiments presented herein. The HBA 100 may also support multiple enclosure management interfaces and protocols, such as I2C and SGPIO, multiple interfaces of the same type, or some custom enclosure management bus.

An HBA 100 may also be configured to support a particular protocol by upgrading the firmware of the HBA 100, or by using host-side applications, command line utilities, or configuration monitors. These operations may involve a direct interface, such as a serial port interface, to the HBA 100. These access and configuration approaches may also be used to change or otherwise configure specific instructions or commands that may be sent to the storage backplane 104.

One or more cables may be utilized to connect the SGPIO ports 110A, 110B of the HBA 100 to the storage backplane 104. In particular, individual cables may be utilized to connect the ports 110A, 110B to the storage backplane 104. Alternatively, a multilane cable 102 may be utilized to connect the individual ports on the HBA 100 to a single multilane connector 120 on the storage backplane 104. It should also be appreciated that HBAs with other port configurations may be utilized. Alternatively, the storage backplane 104 may be configured for use with fewer or more drives. Various other configurations may also be supported.

When the HBA 100 comprises a SAS-compatible HBA and includes SGPIO ports 110A, 110B, the multilane cable 102 may include appropriate connectors 116A, 116B for connecting to the SGPIO ports 110A, 110B. The multilane connector 118 is also appropriately configured for passing the side-band signals from the SGPIO ports 110A, 110B to an appropriate portion of the multilane connector 120 on the storage backplane 104. When the HBA 100 comprises a SATA-compatible HBA and I2C is utilized, an appropriate I2C cable 134 may be utilized for connecting a BMC to the I2C port 132. The SGPIO signals may be routed between the multilane connector 120 and backplane controller 124 associated with the storage backplane 104. The I2C signals may also be routed to the backplane controller 124. According to embodiments, the storage backplane 104 and the backplane controller 124 may be configured to receive enclosure management information on multiple interfaces to thereby support the use of various types and configurations of the HBA.

The storage backplane 104 can provide connectors 122A-122D for interfacing with one or more mass storage devices, such as hard disk drives 106A-106D. According to embodiments, the storage backplane 104 may be mounted within an enclosure such that the hard disk drives 106A-106D can slide into slots within the enclosure. Aligned within such enclosure slots, the hard disk drives 106A-106D may mate directly with the appropriate connector 122A-122D. The storage backplane 104 may provide circuitry for routing signals between the connectors 122A-122D and the appropriate portions of the multilane connector 120. In this manner, the storage backplane 104 can support communication between then HBA 100 and the connected hard disk drives 106A-106D. According to embodiments, the connectors 122A-122D may comprise receptacle connectors for receiving a SAS or SATA mass storage device.

The storage backplane 104 and backplane controller 124 may provide a number of management functions. The backplane controller 124 may be configured to receive management data via various physical interfaces, such as I2C and SGPIO. The backplane controller 124 may be configured to perform various management functions in response to receiving this data. For instance, the backplane controller 124 may receive data from the HBA 100 instructing it to illuminate one of the LEDs 126A-126D for locating a particular one of the hard disk drives 106A-106D. The backplane controller 124 may also illuminate the LEDs 126A-126D to indicate activity on the hard disk drives 106A-106D, or to indicate that one of the hard disk drives 106A-106D is being rebuilt. The LEDs 136A-136D may also be illuminated by the backplane controller 124 to indicate that one of the hard disk drives 106A-106D has failed. LEDs 128, 130 may also be illuminated to provide a global indication that one of the hard disk drives 106A-106D, or that a hard disk drive connected to another connected backplane is active or has failed. Various other LED configurations or status indicators may also be supported by the backplane controller 124.

The backplane controller 124 may provide information to the HBA 100. For instance, the backplane controller 124 may provide data to the HBA 100 indicating whether a particular drive is mated to the enclosure management backplane 104. Additional details regarding the configuration and operation of the backplane controller 124 are provided below with respect to FIGS. 2 and 3.

As discussed, the storage backplane 104 can provide various state indicators, such as LEDs 126A-126D, LEDs 136A-136D, LED 128, and LED 130. It should be appreciated that although these state indicators have been illustrated and described herein primarily as LEDs, other types of visual, audible, or haptic indicators may be utilized to provide indications of mass storage device state and status to a user. Providing a status indication may include illuminating or activating an indicator, terminating or extinguishing an indicator, flashing, or otherwise modulating, an indicator, or any combination thereof.

Figure 2:
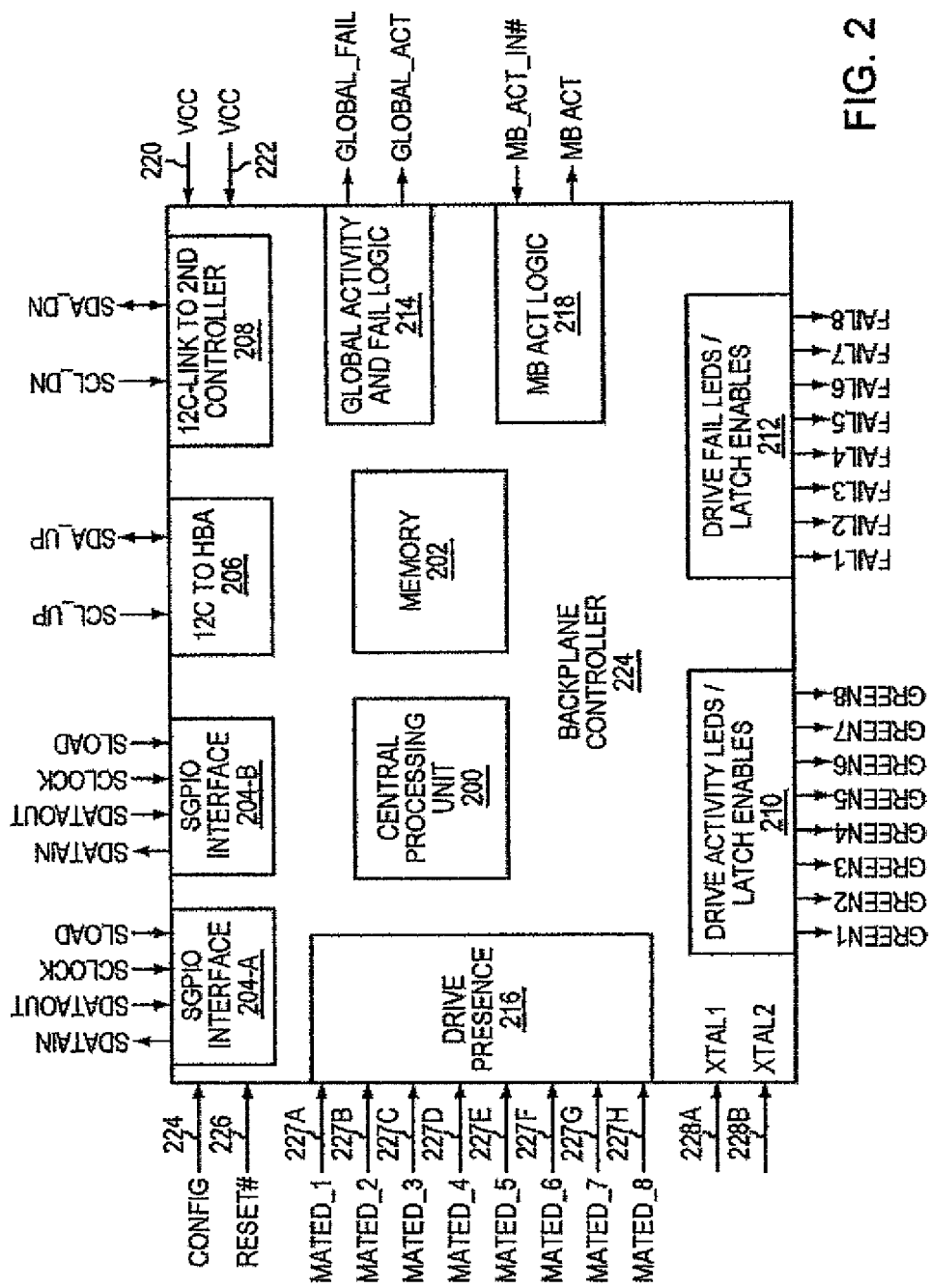
FIG. 2 is a functional block diagram illustrating aspects of a backplane controller according to embodiments presented herein.

Referring to FIG. 2, a functional block diagram illustrates aspects of a backplane controller 224 according to embodiments presented herein. According to embodiments, the backplane controller 224 may comprise a CPU 200 and a memory 202. The CPU 200 can control the overall operation of the backplane controller 224. The CPU 200 may utilize the memory 202 during the performance of its processing functions. It should be appreciated that although the backplane controller 224 is described herein as a programmable microcontroller including a CPU 200 and memory 202, the embodiments presented herein may also be implemented utilizing a general purpose computer, a custom application specific integrated circuit (ASIC), a field-programmable gate array (FPGA) device, or any other type of IC or computing mechanism known to those skilled in the art.

According to embodiments, the backplane controller 224 may be equipped with multiple physical interfaces for communicating management data. For instance, the backplane controller 224 may include two or more SGPIO interfaces 204A, 204B for communicating management data with SAS-equipped HBAs or other types of SAS initiators. The SGPIO interfaces 204A, 204B can support four signals: serial data output (SDATAOUT), serial data input (SDATAIN), clock (SCLOCK), and a framing signal (SLOAD). Using these signals, the backplane controller 224 can receive information regarding the status of connected mass storage devices, such as data indicating whether a mass storage device is active, failed, hot-spare, or otherwise.

According to embodiments, the backplane controller 224 can provide an I2C interface 206 for communicating enclosure management data with a BMC or system management bus. The I2C interface 206 can support two signals: a serial clock line (SCL-UP), and a serial data line (SDA-UP). A downstream interface 208 may be provided for connecting to a downstream I2C device. According to embodiments, the HBA 200 may communicate with the backplane controller 224 over a private I2C bus. The SCSI enclosure services (SES) protocol is utilized for this communication. The I2C or SGPIO bus can be routed to the enclosure management backplane 204 through a cable.

The backplane controller 224 may also include circuitry for generating output signals to drive a visual or audible indicator. For instance, an output module 210 may be provided for illuminating LEDs or other types of activity indicators when one or more of the connected hard disk drives are active. An output module 212 may also be provided for driving LEDs when one or more of the connected hard disk drives has failed. It should be appreciated that a separate output may be provided for driving an individual LED indicating the activity or failure of each hard disk drive.

According to embodiments, the backplane controller 224 may also provide circuitry 314 for driving indicators related to global activity and global failure. It should be appreciated that these outputs may be configured to either drive an LED directly or to connect to an upstream backplane controllers. In this manner, the activity and failure of drives connected to one backplane controller 224 may be communicated to one or more additional upstream backplane controller 224. According to embodiments, the outputs of the output modules 210 and 212 may also be utilized as latch enables to drive external latches and thereby illuminate a larger quantity of LEDs or other indicators.

The backplane controller 224 can provide an input 220 for receiving an appropriate voltage for powering the operation of the backplane controller 224. This voltage may typically be 5 volts or 3.3 volts according to embodiments. A ground connection 222 may also be provided as a power return. The backplane controller 224 may provide inputs 228A, 228B for receiving an appropriate clock signal, an input 244 for enabling a configuration of the IC 224, and a reset input 246 for resetting operation of the backplane controller 224.

The backplane controller 224 may provide one or more pins 227A-227H connected to a drive presence circuit 216.

The drive presence circuit 216 may be configured to detect the presence of a mass storage device. According to embodiments, the drive presence circuit 216 may comprise an analog-to-digital converter (ADC) for detecting the voltage on the pins 227A-227H. Based on the detected voltage, the drive presence circuit 216 may determine whether a mass storage device has been connected. Each of the pins 227A-227H may be utilized to convey information regarding the mated status of a single respective mass storage device. According to embodiments, the drive presence circuit 216 may comprise one or more comparators configured to detect the voltage on the pins 227A-227H.

According to embodiments, the pins 227A-227H and the drive presence circuit 216 may be configured to detect the activity of a mass storage device. In this regard, the backplane controller 224 may be configured to determine, based on the voltage detected at each of the pins 227A-227H, whether a mass storage device associated with each of the pins 227A-227H is active. In this manner, a single one of the pins 227A-227H of the backplane controller 224 can be utilized to determine the mated status of a mass storage device and whether a connected mass storage device is active or inactive. The backplane controller 224 may transmit data regarding the mated status of each mass storage device to an HBA 100 via the SGPIO interfaces 204A, 204B or the I2C interface 206. The backplane controller 224 may also utilize the detected activity information to directly drive LEDs corresponding to active mass storage devices.

Figure 3:
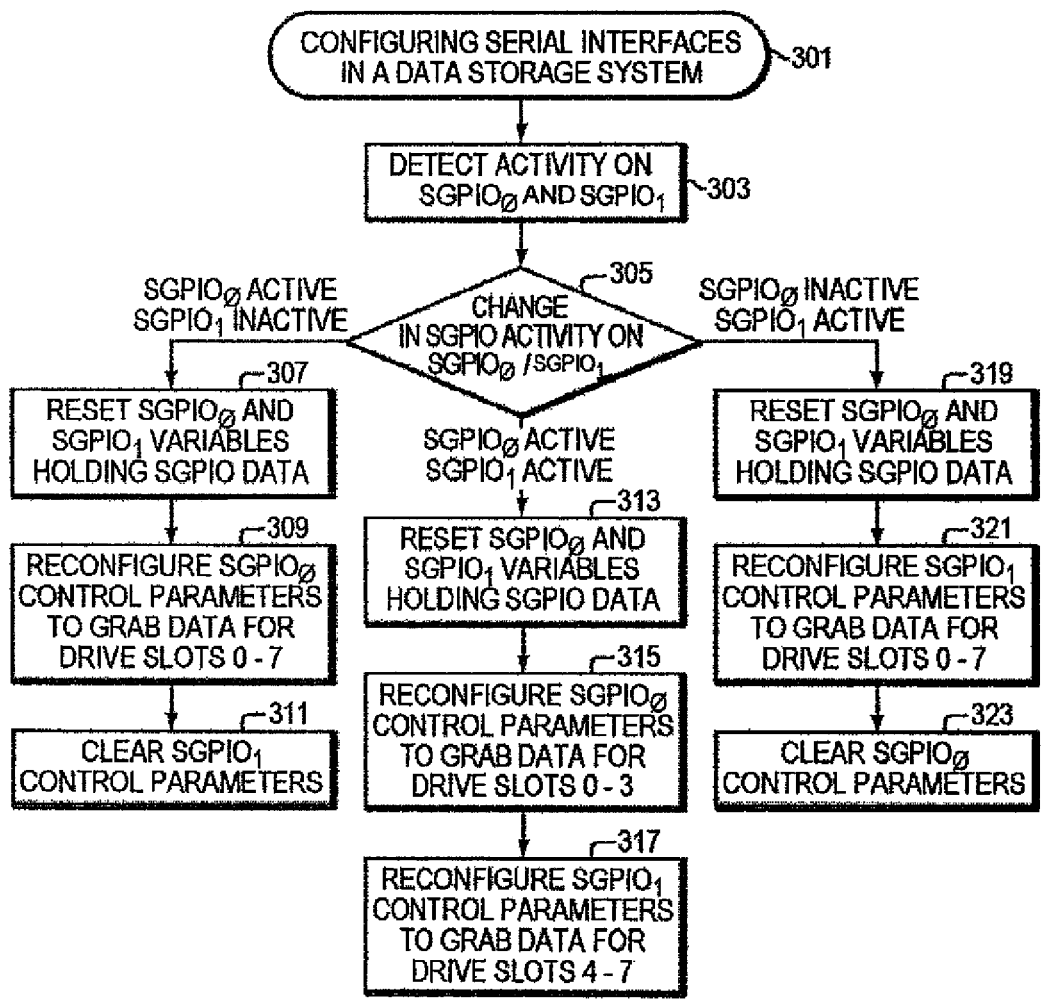
FIG. 3 is a flow chart illustrating operational steps of a method for configuring serial interfaces in a data storage system, according to embodiments presented herein.

Referring to FIG. 3, a flow chart is shown which illustrates operational steps of a computer-implemented method for configuring serial interfaces in a data storage system. As shown, the method includes the step 303 of detecting an activity status on a first serial interface ("SGPIO$_0$") that is configured to operatively connect one or more sets of the plurality of drive slots on the storage backplane to a host bus adapter (HBA), according to a first drive slot assignment. The method further includes the step (also at step 303) of detecting an activity status on a second serial interface ("SGPIO$_1$") that is configured to operatively connect one or more sets of the plurality of drive slots on the storage backplane to the HBA, according to a second drive slot assignment. The method also includes the step of, if a change in the activity status is detected (at step 305) for at least one of the first serial interface and the second serial interface, modifying the first drive slot assignment and the second drive slot assignment (steps 307, 309, 311/313, 315, 317/319, 321, 323).

As shown, if a change in the activity status is detected (at step 305) where the first serial interface is active and the second serial interface is inactive (see path from 305 to 307), then the drive slot assignments are modified such that both the first set of drive slots and the second set of drive slots are communicatively connected to the HBA via the first serial interface (steps 307, 309, 311). The step of modifying the drive slot assignments (steps 307, 309, 311) includes reconfiguring control parameters for the first serial interface (step 309) such that the first serial interface is operative to communicate data corresponding to operation of the first set of drive slots and second set of drive slots, and clearing the control parameters for the second serial interface (step 311).

If a change in the activity status is detected (at step 305) where the first serial interface is inactive and the second serial interface is active (path from 305 to 319), the drive slot assignments are modified such that both the first set of drive slots and the second set of drive slots are communicatively connected to the HBA via the second serial interface (steps 319, 321, 323). Modifying the drive slot assignments (steps 319, 321, 323) includes reconfiguring control parameters for the second serial interface (step 321) such that the second serial interface is operative to communicate data corresponding to operation of the first set of drive slots and second set of drive slots, and clearing the control parameters for the first serial interface (step 323).

If a change in the activity status is detected where the first serial interface and the second serial interface are both active (path from 305 to 313), the drive slot assignments are modified such that the first set of drive slots is communicatively connected to the HBA via the first serial interface and the second set of drive slots is communicatively connected to the HBA via the second serial interface (steps 313, 315, 317). Modifying the drive slot assignments (steps 313, 315, 317) includes reconfiguring control parameters for the first serial interface and the second serial interface (steps 315, 317) such that the first serial interface is operative to communicate data corresponding to operation of the first set of drive slots and the second serial interface is operative to communicate data corresponding to operation of the second set of drive slots.

Activity status detection is performed at regular time intervals and a change in activity status corresponds to a different activity status detected for a second time interval than the activity status detected for a first, immediately prior time interval. Particular aspects of the present invention will now be further described with reference to the drawings in FIGS. 1-3. In one aspect, the present invention relates to a backplane controller of a storage backplane having a plurality of drive slots configured to operatively connect to a corresponding plurality of mass storage devices. Now referring to FIG. 1, in one embodiment, the backplane controller 124 is operative to perform functions that include detecting activity status on a first serial interface 116A, 118, 120 that is configured to operatively connect one or more sets 122A, 122B of a plurality of drive slots 122A-122D on the storage backplane 104 to a host bus adapter (HBA) 100, according to a first drive slot assignment. The backplane controller 124 is further operative to detect an activity status on a second serial interface 116B, 118, 120 that is configured to operatively connect one or more sets 122C, 122D of a plurality of drive slots 122A-122D on the storage backplane 104 to the HBA 100, according to a second drive slot assignment. The backplane controller 124 is also operative to, if a change in the activity status is detected for at least one of the first serial interface 116A, 118, 120 and the second serial interface 116B, 118, 120, modify the first drive slot assignment and the second drive slot assignment.

Active status for a serial interface 116A, 118, 120/116B, 118, 120 corresponds to data being actively communicated between the HBA 100 and storage backplane 104 via the serial interface 116A, 118, 120/116B, 118, 120 and inactive status corresponds to data not being actively communicated between the HBA 100 and storage backplane 104 via the serial interface 116A, 118, 120/116B, 118, 120. Each of the first serial interface 116A, 118, 120 and second serial interface 116B, 118, 120 are operative to, in active status, communicate data comprising at least one of mass storage device indicators, failure indicators, location indicators, and rebuild indicators. Activity status detection is performed at regular time intervals, and a change in activity status corresponds to a different activity status detected for a second time interval than the activity status detected for a first, immediately prior time interval.

In one embodiment, at least one of the first serial interface 116A, 118, 120 and the second serial interface 116B, 118, 120 is a serial general purpose input/output (SGPIO) interface, and at least one of the mass storage devices 106A-106D is a hard disk drive. A set 122A, 122B/122C, 122D of drive slots 122A-122D is defined by a particular number of drive slots 122A-122D, n, where n is an integer greater than one.

The backplane controller 124 is further operative to, if a change in the activity status is detected wherein the first serial interface 116A, 118, 120 is active and the second serial interface 116B, 118, 120 is inactive, modifying the drive slot assignments such that both the first set 122A, 122B of drive slots and the second set 122C, 122D of drive slots are communicatively connected to the HBA 100 via the first serial interface 116A, 118, 120. Modifying the drive slot assignments includes reconfiguring control parameters for the first serial interface 116A, 118, 120 such that the first serial interface 116A, 118, 120 is operative to communicate data corresponding to operation of the first set 122A, 122B of drive slots and second set 122C, 122D of drive slots, and clearing the control parameters for the second serial interface 116B, 118, 120.

Still further, the backplane controller 124 is operative to, if a change in the activity status is detected wherein the first serial interface 116A, 118, 120 is inactive and the second serial interface 116B, 118, 120 is active, modify the drive slot assignments such that both the first set 122A, 122B of drive slots and the second set 122C, 122D of drive slots are communicatively connected to the HBA 100 via the second serial interface 116B, 118, 120. Modifying the drive slot assignments includes reconfiguring control parameters for the second serial interface 116B, 118, 120 such that the second serial interface 116B, 118, 120 is operative to communicate data corresponding to operation of the first set 122A, 122B of drive slots and second set 122C, 122D of drive slots, and clearing the control parameters for the first serial interface 116A, 118, 120.

The backplane controller 124 is also operative to, if a change in the activity status is detected wherein the first serial interface 116A, 118, 120 and the second serial interface 116B, 118, 120 are both active, modifying the drive slot assignments such that the first set 122A, 122B of drive slots 122A-122D is communicatively connected to the HBA 100 via the first serial interface 116A, 118, 120 and the second set 122C, 122D of drive slots 122A-122D is communicatively connected to the HBA 100 via the second serial interface 116B, 118, 120. Modifying the drive slot assignments includes reconfiguring control parameters for the first serial interface 116A, 118, 120 and the second serial interface 116B, 118, 120 such that the first serial interface 116A, 118, 120 is operative to communicate data corresponding to operation of the first set 122A, 122B of drive slots 122A-122D and the second serial interface 116B, 118, 120 is operative to communicate data corresponding to operation of the second set 122C, 122D of drive slots 122A-122D.

According to another aspect, the present invention relates to a backplane controller of a storage backplane having a plurality of drive slots configured to operatively connect to a corresponding plurality of mass storage devices. With reference again to FIG. 1, in one embodiment, the backplane controller 124 is operative to perform functions that include detecting activity status on each of a plurality of serial interfaces 116A, 118, 120/116B, 118, 120 that are each configured to operatively connect one or more sets of the plurality of drive slots 122A-122D to a host bus adapter (HBA) 100, according to a respective drive slot assignment. The backplane controller 124 is further operative to, if a change in the activity status is detected for at least one of the plurality of serial interfaces 116A, 118, 120/116B, 118, 120, modify the drive slot assignment for each respective one of the plurality of serial interfaces 116A, 118, 120/116B, 118, 120. A set 122A, 122B/122C, 122D of drive slots 122A-122D is defined by a particular number of drive slots 122A-122D, n, where n is an integer greater than one.

Active status for a serial interface 116A, 118, 120/116B, 118, 120 corresponds to data being actively communicated between the HBA 100 and storage backplane 104 via the serial interface 116A, 118, 120/116B, 118, 120 and inactive status corresponds to data not being actively communicated between the HBA 100 and storage backplane 104 via the serial interface 116A, 118, 120/116B, 118, 120. Each of the plurality of serial interfaces 116A, 118, 120/116B, 118, 120 is operative to, in active status, communicate data comprising at least one of mass storage device indicators, failure indicators, location indicators, and rebuild indicators. Activity status detection is performed at regular time intervals and a change in activity status corresponds to a different activity status detected for a second time interval than the activity status detected for a first, immediately prior time interval.

In yet another aspect, the present invention relates to a backplane controller of a storage backplane having a plurality of drive slots configured to operatively connect to a corresponding plurality of mass storage devices. With reference again to FIG. 1, in one embodiment, a backplane controller 124 is operative to perform functions that include detecting activity status on each of a plurality of serial interfaces 116A, 118, 120/116B, 118, 120 that are each configured to operatively connect one or more sets of a plurality of drive slots 122A-122D to a host bus adapter (HBA) 100, according to a respective drive slot assignment. The plurality of serial interfaces comprises more than two serial interfaces and at least two (116A, 118, 120/116B, 118, 120) of the plurality of serial interfaces are serial general purpose input/output (SGPIO) interfaces. The backplane controller 124 is operative to, if a change in the activity status is detected for at least one of the plurality of serial interfaces modify the drive slot assignment for each respective one of the plurality of serial interfaces. A set 122A, 122B/122C, 122D of drive slots 122A-122D is defined by a particular number of drive slots n, where n is an integer greater than one.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A backplane controller of a storage backplane having a plurality of drive slots configured to operatively connect to a corresponding plurality of mass storage devices, the backplane controller operative to perform functions comprising:
    (a) detecting whether data are actively communicated between a host bus adapter (HBA) and the storage backplane through a first general purpose input/output (SGPIO) interface coupled with the HBA, wherein the first SGPIO interface is configured to communicate, from the HBA to the storage backplane, activity status of the mass storage devices connected to a first set of drive slots on the storage backplane, wherein the first set of drive slots are selected from the plurality of drive slots according to a first drive slot assignment, comprising control parameters for the first SGPIO interface;

(b) detecting whether data are actively communicated between the HBA and the storage backplane through a second SGPIO interface coupled with the HBA, wherein the second SGPIO interface is different from the first SGPIO interface, and is configured to communicate, from the HBA to the storage backplane, activity status of the mass storage devices connected to a second set of drive slots on the storage backplane, wherein the second set of drive slots are selected from the plurality of drive slots according to a second drive slot assignment, comprising control parameters for the second SGPIO interface; and (c) in response to a determination that data are not actively communicated between the HBA and the storage backplane through the first SGPIO interface, modifying the control parameters of the first drive slot assignment for the first SGPIO interface and the control parameters of the second drive slot assignment for the second SGPIO interface such that the communication of the activity status of the mass storage devices connected to the first set of drive slots between the HBA and the storage backplane is switched, according to the modified control parameters of the first drive slot assignment for the first SGPIO interface and the modified control parameters of the second drive slot assignment for the second SGPIO interface, from being through the first SGPIO interface to being through the second SGPIO interface.

2. The backplane controller of claim 1, wherein each of the first SGPIO interface and second SGPIO interface is operative to, when in active status, communicate data comprising at least one of mass storage device indicators, failure indicators, location indicators, and rebuild indicators.

3. The backplane controller of claim 1, wherein the detecting procedures are performed at regular time intervals.

4. The backplane controller of claim 1, wherein modifying the control parameters of the first and second drive slot assignments comprises reconfiguring the control parameters for the first SGPIO interface such that the first SGPIO interface is operative to communicate data corresponding to operation of the first set of drive slots and second set of drive slots, and clearing the control parameters for the second SGPIO interface.

5. The backplane controller of claim 1, wherein modifying the control parameters of the first and second drive slot assignments comprises reconfiguring the control parameters for the second SGPIO interface such that the second SGPIO interface is operative to communicate data corresponding to operation of the first set of drive slots and second set of drive slots, and clearing the control parameters for the first SGPIO interface.

6. The backplane controller of claim 1, wherein each of the first SGPIO interface and the second SGPIO interface includes a single multilane connector on the storage backplane, a SGPIO port at the HBA, and a multilane connector between the HBA and the storage backplane.

7. The backplane controller of claim 1, wherein the first SGPIO interface includes a single multilane connector on the storage backplane, a first SGPIO port at the HBA, and a multilane connector between the HBA and the storage backplane, wherein the second SGPIO interface includes the single multilane connector on the storage backplane, a second SGPIO port at the HBA, and the multilane connector between the HBA and the storage backplane.

8. The backplane controller of claim 7, wherein each of the plurality of drive slots is connected with a hard disk drive.

9. The backplane controller of claim 1, wherein each of the plurality of drive slots is connected with a hard disk drive.

10. The backplane controller of claim 1, wherein the first serial interface and the second serial interface use a same protocol for communication.

11. The backplane controller of claim 1, wherein at least one of the mass storage devices is a hard disk drive.

12. A backplane controller of a storage backplane having a plurality of drive slots configured to operatively connect to a corresponding plurality of mass storage devices, the backplane controller operative to perform functions comprising:

(a) detecting whether data are actively communicated between a same host bus adapter (HBA) and the storage backplane through each of a plurality of serial interfaces coupled with the HBA, wherein each of the serial interfaces is configured to communicate, from the HBA to the storage backplane, activity status of the mass storage devices connected to a respective different set of drive slots on the storage backplane, wherein each of the respective different set of drive slots is selected from the plurality of drive slots according to a respective drive slot assignment, and each of the respective drive slot assignment comprises control parameters for the corresponding one of the serial interfaces; and (b) in response to a determination that data are not actively communicated between the HBA and the storage backplane through a first interface of the plurality of serial interfaces, modifying the control parameters of the corresponding drive slot assignment for the first interface and the control parameters of the corresponding drive slot assignment for a second interface of the plurality of serial interfaces such that the communication of the activity status of the mass storage devices currently configured to be communicated through the first interface is switched, according to the modified control parameters of the corresponding drive slot assignment for the first interface and the modified control parameters of the corresponding drive slot assignment for the second interface, from being through the first interface to being through the second interface.

13. The backplane controller of claim 12, wherein each of the plurality of serial interfaces is operative to, when in active status, communicate data comprising at least one of mass storage device indicators, failure indicators, location indicators, and rebuild indicators.

14. The backplane controller of claim 12, wherein the detecting procedures are performed at regular time intervals.

15. The backplane controller of claim 12, wherein at least one of the mass storage devices is a hard disk drive.

16. A backplane controller of a storage backplane having a plurality of drive slots configured to operatively connect to a corresponding plurality of mass storage devices, the backplane controller operative to perform functions comprising:

(a) detecting whether data are actively communicated between a same host bus adapter (HBA) and the storage backplane through each of a plurality of serial interfaces coupled with the HBA, wherein each of the serial interfaces is configured to communicate, from the HBA to the storage backplane, activity status of the mass storage devices connected to a respective different set of drive slots on the storage backplane, wherein each of the respective different set of drive slots is selected from the plurality of drive slots according to a respective drive slot assignment, and each of the respective drive slot assignment comprises control parameters for the corresponding one of the serial interfaces, wherein the plurality of serial interfaces comprises more than two serial interfaces and at least two of the plurality of serial interfaces are serial general purpose input/output (SGPIO) interfaces; and (b) in response to a determination that data are actively communicated between the HBA and the storage backplane through a first interface of the plurality of serial interfaces, wherein the first interface does not currently communicate activity status of the mass storage devices between the HBA and the storage backplane, modifying the control parameters of the corresponding drive slot assignment for the first interface and the control parameters of the corresponding drive slot assignment for a second interface of the plurality of serial interfaces such that the communication of at least one of the activity status of the mass storage devices configured to be communicated through the second interface is switched, according to the modified control parameters of the drive slot assignment for the first interface and the modified control parameters of the drive slot assignment for the second interface, from being through the second interface to being through the first interface.

17. The backplane controller of claim 16, wherein at least one of the mass storage devices is a hard disk drive.

* * * * *